Patented July 4, 1933

1,916,805

UNITED STATES PATENT OFFICE

FRIEDRICH MEIDERT, OF FRANKFORT-ON-THE-MAIN-GRIESHEIM, AND HERMANN SCHATZ, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY

PRODUCTION OF SICCATIVES ON THE BASE OF NAPHTHENIC ACID

No Drawing. Application filed January 11, 1930, Serial No. 420,293, and in Germany February 22, 1929.

This invention relates to improvements in the production of siccatives on the base of naphthenic acid. Cobaltous, manganous, lead, zinc and calcium naphthenate have been used in the manufacture of varnishes and lacquers chiefly on the base of linseed oils owing to their excellent siccative properties, but hitherto they could only be put on the market in the solid state, or dissolved in volatile organic solvents such as lacquer benzine, turpentine oil, benzene etc. Said products are known in the trade as "soligen dryers".

For dissolving the solid siccatives in volatile solvents, they are first melted in a vessel at 100° to 160° C. whereupon the volatile solvent is added. Many consumers are prohibited from carrying out this dissolving operation by the rules given with regard to the use of inflammable substances. When the siccatives are being dissolved by the producer himself the price of the product is considerably increased by the expenses for packing and transporting these ingredients to the consumer, more particularly when the regulations call for transportation by fire-proof cars. Furthermore the application of the siccatives in the form of such solutions is restricted, since volatile solvents are not desirable or even may be detrimental for many purposes, for instance, for making varnishes, printing inks, "linoxine" etc. For dissolving the solid siccatives in linseed oil, to get it ready for use, the latter must be heated to the above-said temperatures, this causing some difficulties to many consumers.

Attempts which were made to dissolve the solid soligens, more or less concentrated, in drying or semi-drying oils, such as linseed oil, wood oil, soya bean oil etc., have been without success owing to the fact that the dissolving power of these oils is rather limited, so that the greater part of the siccatives, when dissolved at elevated temperature, gradually precipitates on cooling-down and standing, settles on the bottom of the dissolving vessel, and hardens.

According to the present invention the free fatty acids of the said oils are employed as solvents for the naphthenate instead of the oils themselves. We have found that these fatty acids are such excellent solvents for naphthenates, especially for cobaltous, manganous and cobalt-manganous naphthenates, that solutions of these siccatives can easily be produced in any desired concentration.

The most suitable and simple method for preparing said solutions or so-called "extracts" consists in adding an amount of, for instance, linoleic acid, corresponding to the desired concentration, to the solid siccatives during the evaporation of the water from said substances. By short melting and careful stirring, a quite homogeneous extract is obtained without difficulty, the melting of this mixture being effected at considerably lower temperature than that of a solid siccative. Of course, also completely dried siccatives may be made up into extracts in the described manner. The extracts of the heavy metal naphthenates thus obtained represent clear, mobile or more or less viscous, but perfectly homogeneous products showing considerable advantages over the solid naphthenates. They are very easily completely soluble in drying oils and in the usual organic solvents, forming clear solutions. Thereby they involve the advantage of being easily and conveniently handled in the manufacture of varnishes, printing inks, lacquers and the like. They may be added to the latter in the cold or in a slightly heated state. Moreover, these varnishes, printing inks and lacquers show a considerably brighter color than those prepared by means of solid siccatives, and show an excellent drying effect immediately after preparing them. This effect is probably due to the fact that the degree of dispersion of the siccative metal is by far greater in the dissolved than in the solid state. The naphthenates are permanently stable at elevated temperatures as well as at temperatures below zero. No alteration or decomposition such as oxidation or gelatination takes place.

*Examples*

1. 1000 parts by weight of technically pure naphthenic acid are treated at boiling temperature with 200 to 210 parts by weight of caustic soda, according to the acid number, while stirring. A clear soap solution is obtained. Then a solution of about 630 to 650 parts by weight of cobaltous sulfate is added; the resulting precipitate is washed, for example, three times with hot water and, after the removal of the water, is desiccated by a short melting operation performed at about 130° C., the desired amount of linoleic acid required for dissolving the product being added at the same time. Good results are obtained by mixing one part by weight of linoleic acid with one, two or four parts by weight of the solid siccative.

2. 1000 parts by weight of naphthenic acid are converted into the salt as described in example 1; the clear soap solution is at first mixed with a solution of 400 parts by weight of manganous sulfate, and the remaining naphthene soap is wholly precipitated by the addition of a solution of 100 to 110 parts by weight of cobaltous sulfate, whereupon the precipitate is washed out as above described. During the melting and desiccating operation 1000 or 500 or 250 parts by weight of linoleic acid, wood oil acid etc. are added, according to the desired concentration, whereby a perfectly homogeneous cobalto-manganous extract is obtained.

Siccative extracts of the same homogeneity may further be obtained by partially substituting the fatty acids of drying or semi-drying oils used as solvents by the oils themselves. Although the capacity of the fatty oils for dissolving the siccatives is rather restricted, the ratio of fatty acids to fatty oils may be varied in wide limits. The amount of the fatty oils may even considerably surpass that of the corresponding fatty acids without causing precipitation of the siccative. This phenomenon is due to the nearly unlimited capacity of the substances to dissolve naphthenates. Any desired fatty acid of any drying or semi-drying oil may be employed together with any of these fatty oils, or mixtures of different fatty acids with mixtures of different fatty oils may be used.

The chief advantage of this modification of the invention consists in that the natural fatty oils such as linseed oil, wood oil, soya bean oil, poppy oil and others are considerably cheaper than the free fatty acids obtained by decomposing the said oils. A further advantage consists in that the extracts, owing to the lower point of solidification of the oils (as compared with that of the fatty acids), are less subject to thickening at low temperatures.

*Example*

1000 parts by weight of technically pure naphthenic acid are treated at boiling temperature with 200 to 210 parts by weight (according to the acid number) of caustic soda or another alkali. The clear soap solution is at first mixed with a solution of 400 parts by weight of crystallized lead nitrate and the remaining naphthene soap is wholly precipitated by the addition of a solution of about 140 parts by weight of manganous sulfate. The resulting precipitate is, for example, three times washed with hot water and, after the removal of the washing water, desiccated by a short melting operation at about 130° C. During the desiccation 290 kilograms of linoleic acid+870 kilograms of linseed oil, or 145 kilograms of linoleic acid+435 kilograms of linseed oil, or 72.5 kilograms of linoleic acid+217.5 kilograms of linseed oil are added, said quantities being based on an output of 1160 kilograms of the naphthenate, and corresponding to a desired ratio of solid siccative to solvent in the final product of 1:1, 2:1 or 4:1 respectively.

A perfectly homogeneous extract of lead-manganese naphthenate (so-called lead-manganese soligen extract) is obtained not in the least differing from that obtained from pure linoleic acid.

We claim:

1. As a new composition of matter a concentrated siccative preparation for lacquers and varnishes comprising a solution of a naphthenic acid salt of at least one metal of the group consisting of cobalt, manganese, lead, zinc and calcium in a free fatty acid of a drying oil, said naphthenate constituting at least about 50% by weight of the preparation.

2. As a new composition of matter a concentrated siccative preparation for lacquers and varnishes comprising a solution of a naphthenic acid salt of at least one metal of the group consisting of cobalt, manganese, lead, zinc and calcium in a mixture consisting of a free fatty acid of a drying oil and a drying oil, said naphthenate constituting at least about 50% by weight of the preparation.

3. As a new composition of matter a concentrated siccative preparation for lacquers and varnishes comprising a solution of a naphthenic acid salt of at least one metal of the group consisting of cobalt, manganese, lead, zinc and calcium in free linoleic acid, said naphthenate constituting about 50% to about 80% by weight of the preparation.

4. As a new composition of matter a concentrated siccative preparation for lacquers and varnishes comprising a solution of a naphthenic acid salt of at least one metal of the group consisting of cobalt, manganese, lead, zinc and calcium in a mixture containing free linoleic acid and linseed oil said naphthenate constituting about 50% to about 80% by weight of the preparation.

5. As a new composition of matter a concentrated siccative preparation for lacquers and varnishes comprising a solution of a naphthenic acid salt of at least one metal of the group consisting of cobalt, manganese, lead, zinc and calcium in a mixture containing free linoleic acid and linseed oil, the amount of the linseed oil exceeding the amount of the free linoleic acid said naphthenate constituting about 50% to 80% by weight of the preparation.

6. As a new composition of matter a concentrated siccative preparation for lacquers and varnishes comprising a solution of cobaltous naphthenate in free linoleic acid said naphthenate constituting about 50% to about 80% by weight of the preparation.

7. As a new composition of matter a concentrated siccative preparation for lacquers and varnishes comprising a solution of cobaltous-manganous naphthenate in free linoleic acid said naphthenate constituting about 50% to about 80% by weight of the preparation.

In testimony whereof, we affix our signatures.

FRIEDRICH MEIDERT.
HERMANN SCHATZ.